(12) United States Patent
Ohmori

(10) Patent No.: US 6,567,361 B1
(45) Date of Patent: *May 20, 2003

(54) DISK TRAY FORMED WITH GROOVE FOR PREVENTING DUST INTRUSION

(75) Inventor: Kiyoshi Ohmori, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,407

(22) Filed: Dec. 19, 1997

(30) Foreign Application Priority Data

Dec. 27, 1996 (JP) .............................. 8-350559

(51) Int. Cl.⁷ .............................................. G11B 33/02
(52) U.S. Cl. ...................................... 369/77.1; 369/75.1
(58) Field of Search ............................... 369/75.1, 75.2, 369/77.1, 77.2, 292, 291; 360/133, 96.5

(56) References Cited

U.S. PATENT DOCUMENTS

| | | | | |
|---|---|---|---|---|
| 4,561,085 A | * | 12/1985 | Funabashi | 369/77.1 |
| 4,802,046 A | * | 1/1989 | Tanaka et al. | 360/133 |
| 5,265,072 A | * | 11/1993 | Numata et al. | 369/75.2 |
| 5,467,235 A | * | 11/1995 | Watanabe | 360/99.06 |
| 5,561,653 A | * | 10/1996 | Liou et al. | 369/77.1 |
| 5,784,350 A | * | 7/1998 | Akiba et al. | 369/77.1 |
| 5,903,528 A | * | 5/1999 | Yoshimura | 369/34 |

* cited by examiner

Primary Examiner—Brian E. Miller
Assistant Examiner—Tod A Kupstas
(74) Attorney, Agent, or Firm—Jay H. Maioli

(57) ABSTRACT

A disk drive apparatus in which a disk is held on a tray 5 and is then loaded. The disk drive apparatus includes an arrangement in which a wall portion 15 is provided at the front portion of the tray 5 for preventing an invasion of dust and the like.

4 Claims, 5 Drawing Sheets

DISK TRAY FORMED WITH GROOVE FOR PREVENTING DUST INTRUSION

BACKGROUND

1. Field of the Invention

The present invention relates to a disk drive apparatus with an arrangement in which a disk is placed on a tray and then loaded, especially to an arrangement for avoiding an invasion of dust and the like.

2. Background of the Invention

A disk drive apparatus such as a CD, a CD-ROM, a DVD, a DVD-ROM and the like, for example, has an arrangement in which a tray is provided being capable of moving between a drawn-out position and an accommodation position relative to an apparatus body, and loading is conducted by putting a disk on the tray, is widely used in practice.

An example of a disk drive apparatus of this kind will be explained with reference to FIG. 1 and FIG. 2.

As shown in FIG. 1, a disk drive apparatus has a main body 1 which comprises an outer housing 2. The outer housing of the main body 1 accommodates therein a disk drive mechanism unit for recording and reproducing a disk (not shown). The disk drive mechanism unit is constituted by being provided with a spindle motor for driving and rotating the disk, an optical head for reading out and writing a signal from/on the disk and the like.

On a front face as a face for an escutcheon of the main body 1 is attached a front panel 3. A tray 5 is provided so as to be accommodated in and drawn out from an entry and exit portion 4 which is formed on the front panel 3. The tray 5 has a disk holding concave portion 6 and is linearly moved by a tray moving mechanism provided inside the main body 1, between the drawn-out position and the accommodation position relative to the main body 1.

Also, a moving action of the tray 5 is carried out by depressing a tray moving operation button 7 provided on the front panel 3. That is, when the tray moving operation button 7 is depressed as the tray 5 is in the accommodation position, the tray 5 moves from the accommodation position to the drawn-out position, and also, when the tray moving operation button 7 is depressed as the tray is in the drawn-out position, the tray 5 is supposed to be moved from the drawn-out position to the accommodation position.

Then, when the tray 5 is at the drawn-out position, if a disk D is held on the disk holding concave portion 6 of the tray 5, and if the tray 5 is moved to the accommodation position, the disk D is loaded onto the disk drive mechanism portion within the apparatus main body 1.

When the disk D is loaded in this manner, the spindle motor of the disk drive mechanism unit elevates and a center portion of the disk D is chucked by a turn table fitted to the spindle motor and at the same time, an optical head faces a signal recording face of the disk, whereby a state capable of recording and reproducing of a signal on/from the disk D is in place.

Also, through a middle portion of the tray 5 is formed an opening 8 or an escape portion to the turn table and the optical head of the disk drive mechanism unit.

Also, on a front end face of the tray 5 is fit an escutcheon plate 9 such that when the tray 5 is in the accommodation position, the escutcheon plate 9 may be positioned in the entry and exit portion 4 as shown in FIG. 1.

Meanwhile, the above mentioned disk drive apparatus is, in many cases, used by being incorporated in computer equipment. In this case, there is a problem that dust and the like easily invade the apparatus main body 1 through the entry and exit portion 4 by a current of air and the like caused by a cooling fan and the like of the computer equipment.

Then, a conventional disk drive apparatus is not so structured as to prevent the intrusion of dust and the like (though the entry and exit portion 4 is closed with the escutcheon plate 9 of the tray 5 since, dust and the like easily invade through the clearance between the escutcheon plate 9 and the entry and exit portion 4).

If dust and the like easily invade the apparatus main body, they attach onto a signal recording surface of a disk and an objective lens of an optical head, and cause problems associated with recording and reproducing of a signal, and thus reliability is impaired.

SUMMARY OF THE INVENTION

The present invention is implemented with a view to solving those problems.

In order to achieve the above mentioned object, the present invention, in a disk drive apparatus having an arrangement in which a tray is provided capable of moving between a drawn-out portion and an accommodation portion relative to an apparatus main body, and a disk is held on the tray and then is loaded on a disk drive mechanism unit within the apparatus main body with a disk rested on the tray, comprises a wall portion on a front portion of the tray for avoiding an invasion of dust and the like into the apparatus main body. With such an arrangement, problems associated with recording and reproducing due to the dust and the like are decreased and reliability is enhanced.

DESCRIPTION OF THE PREFERRED EMBODIMENT

Hereafter, an embodiment according to the present invention will be explained in detail with reference to the drawings.

Figure 1:
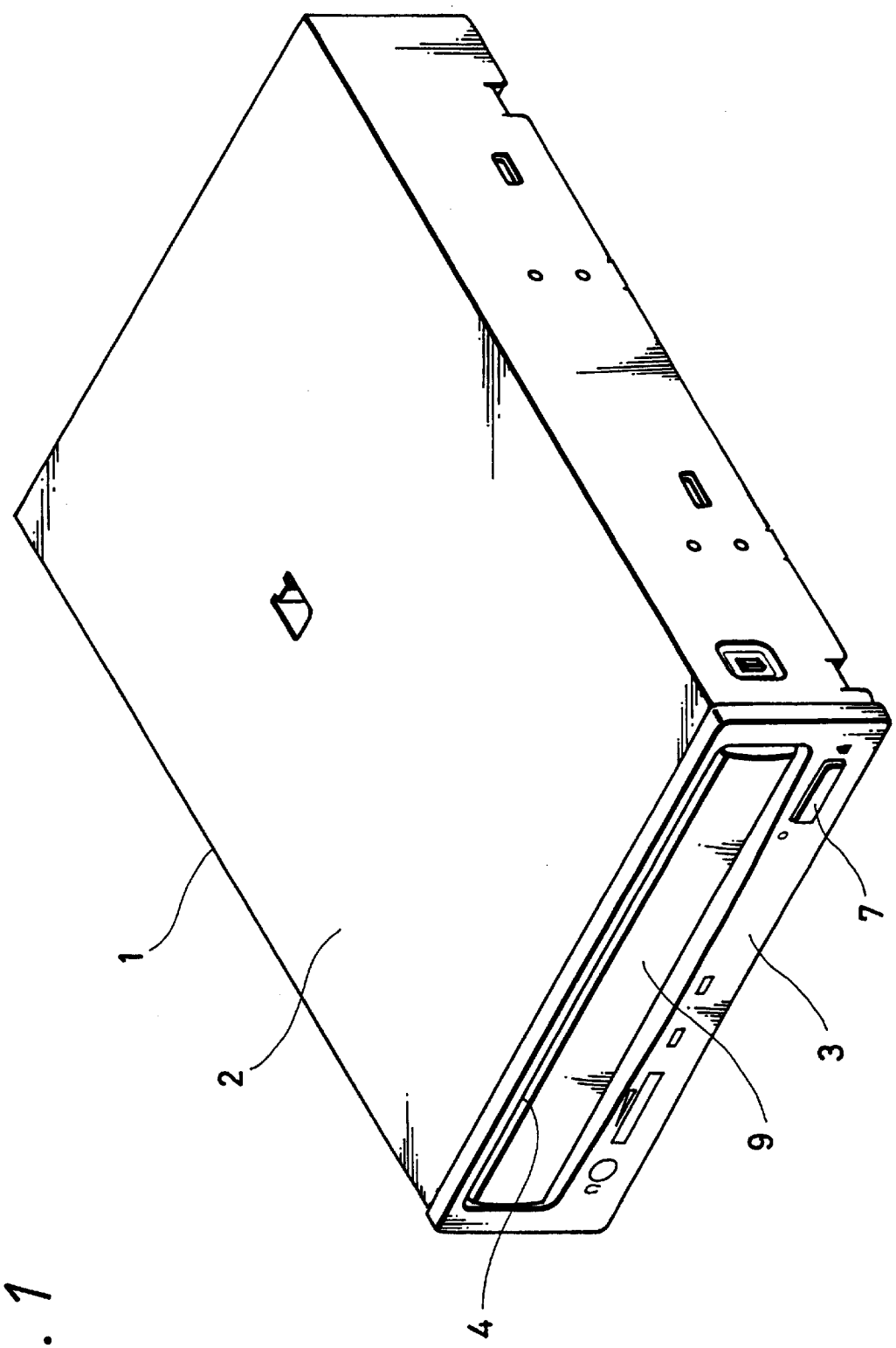
FIG. 1 is a perspective view of a disk drive apparatus with a tray being accommodated therein.
Figure 2:
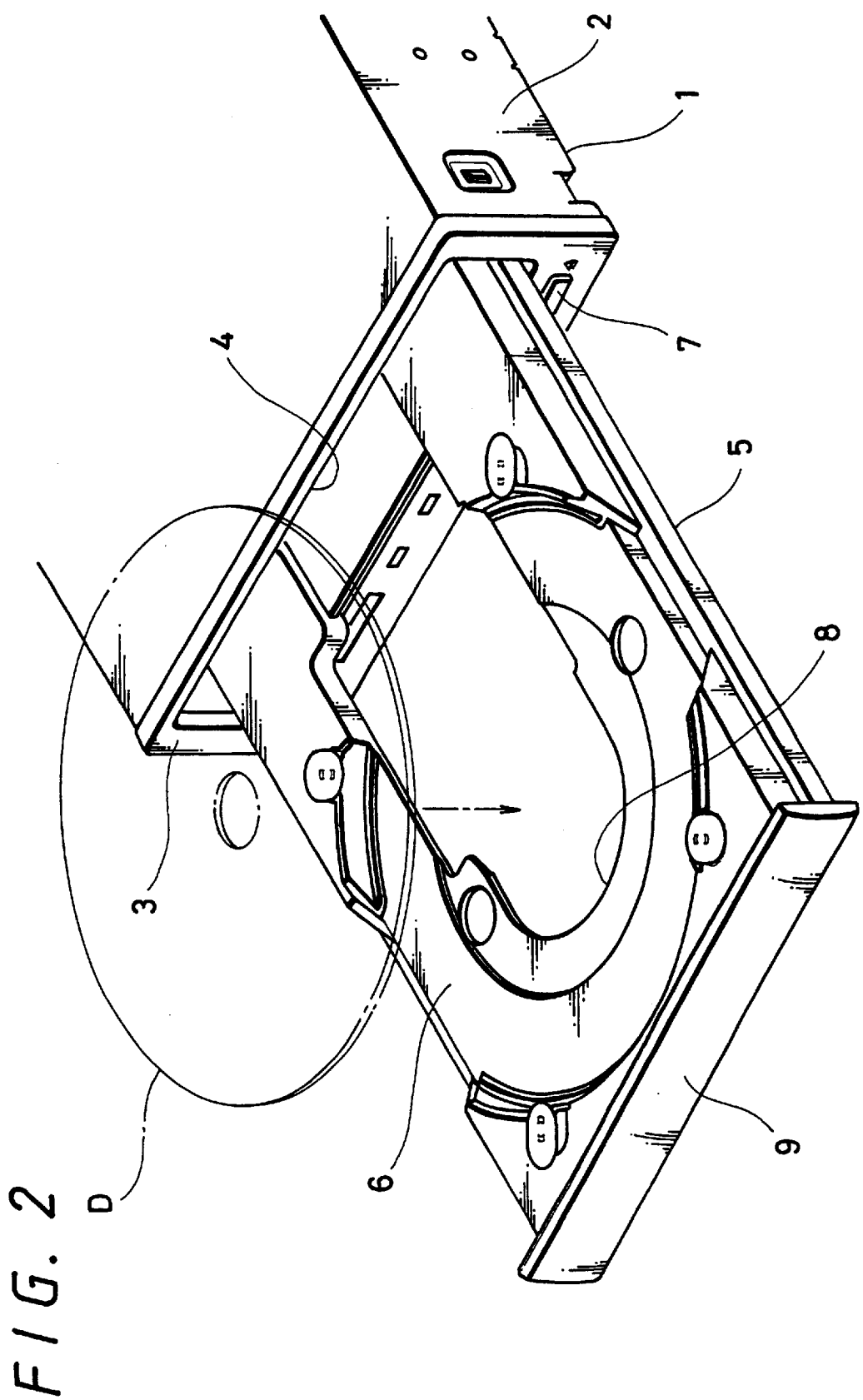
FIG. 2 is a perspective view of a disk drive apparatus with the tray being drawn out therefrom.

As shown in FIG. 1 and FIG. 2, the disk drive apparatus includes the apparatus main body 1 and the outer housing 2, and within the main apparatus body 1 is a disk drive mechanism unit for recording and reproducing a disk. The disk drive mechanism unit is constituted by a spindle motor for driving and rotating the disk, an optical head for reading out and writing a signal from/on the disk and the like.

On a front face as a face for an escutcheon of the main body 1 is attached a front panel 3. A tray 5 is provided so as to be accommodated in and drawn out from an entry and exit portion 4 which is formed through the front panel 3. The tray 5 has a disk holding concave portion 6 and is linearly moved by a tray moving mechanism provided inside the main body 1, between a drawn-out position and an accommodation position relative to the main body 1.

Also, a moving action of the tray 5 is carried out by depressing a tray moving operation button 7 provided on the front panel 3. That is, when the tray moving operation button 7 is depressed when the tray 5 is positioned at the accommodation position, the tray 5 moves from the accommodation position to the drawn-out position, and also, when the tray moving operation button 7 is depressed when the tray is in the drawn-out position, the tray 5 is supposed to be moved from the drawn-out position to the accommodation position.

Then, in the state that the tray 5 is located at the drawn-out position, if a disk D is supported on the disk holding concave portion 6 of the tray 5 and the tray 5 is moved from the drawn-out position to the accommodation position, the disk D is loaded onto the disk drive mechanism unit within the apparatus main body 1.

When the disk D is loaded in this manner, the spindle motor of the disk drive mechanism unit elevates and a center portion of the disk D is chucked by a turn table fitted to the spindle motor and at the same time, the optical head faces a signal recording surface of the disk D and a state in which recording and reproducing of a signal on/from the disk D is in place.

Also, through the middle portion of the tray 5 is formed an opening 8 or an escape portion to the turn table and the optical head of the disk drive mechanism portion.

Also, on the front end face of the tray 5 is fitted an escutcheon plate 9. When the tray 5 is in the accommodation position, the escutcheon plate 9 is positioned in the entry and exit portion 4 as shown in FIG. 1.

Figure 3:
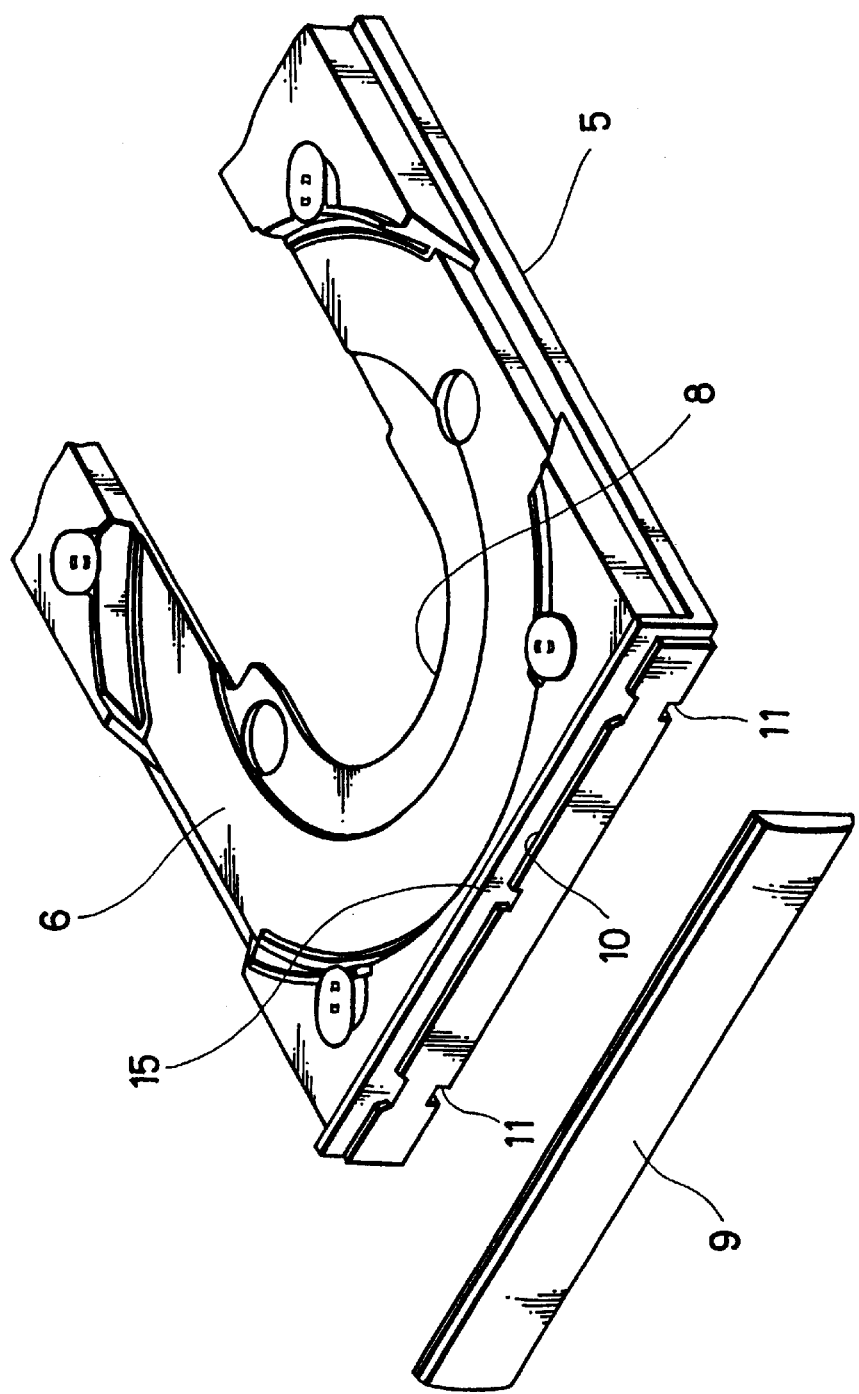
FIG. 3 is an exploded perspective view of an essential portion of the tray in the disk drive apparatus according to the present invention.
Figure 4:
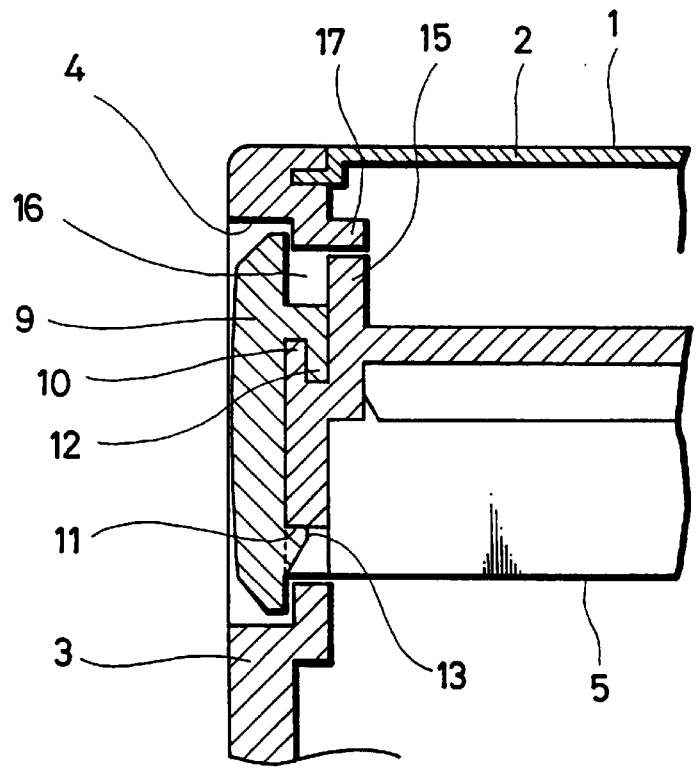
FIG. 4 is a longitudinal section side view of an essential portion of the disk drive apparatus according to the present invention.

The escutcheon plate 9 is, as shown in FIG. 3 and FIG. 4, is attached to the front end face of the tray 5 by fitting the escutcheon plate with the front end face of the tray. That is, on a front end face of the tray 5 are provided an engagement fringe portion 10 and an engagement concave portion 11. On the other hand, on a reverse surface side of the escutcheon plate 9 are provided an engagement nail portion 12 and an engagement convex portion 13. Fitting the engagement nail portion 12 and the engagement convex portion 13 respectively to the engagement fringe portion 10 and the engagement concave portion 11, the escutcheon plate 9 is fixed on the tray 5.

Figure 5:
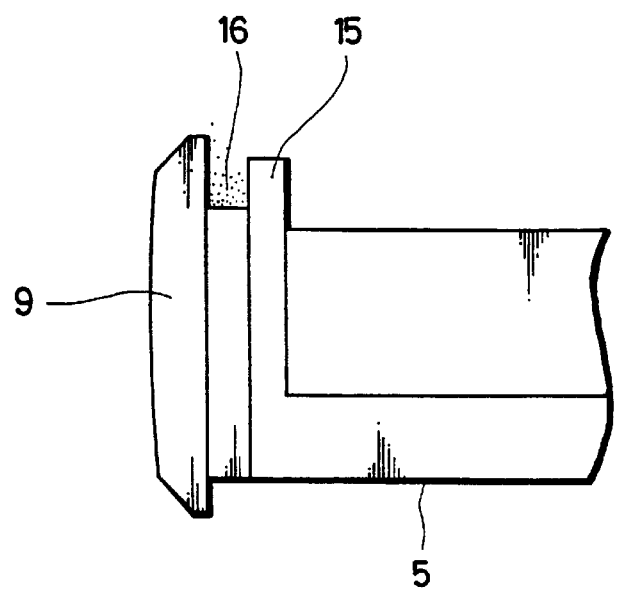
FIG. 5 is a side view of an essential portion of the tray in a disk drive apparatus according to the present invention.

Then, in the disk drive apparatus, especially in this embodiment, as FIG. 3 through FIG. 5 show, at a front portion on the upper face side of the tray 5, a wall portion 15 is provided for preventing the invasion of the dust and the like into the apparatus main body 1.

The wall portion 15 is provided to be extended over the entire width of the tray 5 in parallel with the escutcheon plate 9 in from the escutcheon plate 9, and between the escutcheon plate 9 and the wall portion 15 is provided a groove 16 of a predetermined width. Also, the wall portion 15 is provided to have a height a little lower than that of the escutcheon plate 9. At an inner portion of the entry and exit portion 4 of the front panel 3 is projectingly provided a convex portion 17 in a stair-like shape facing an upper end surface of the wall portion 15 with a small clearance therebetween.

Then, when the tray 5 is in the accommodation position in the apparatus main body 1, the entry and exit portion 4 becomes closed by the escutcheon plate 9 and the wall portion 15. In this closed state, even if any dust and the like try to invade from outside of the disk drive apparatus into the apparatus main body 1 over the escutcheon plate 9, the dust and the like are blocked by the wall portion 15, thereby making it possible to effectively prevent the invasion of the dust and the like into the apparatus main frame 1.

Further, in the disk drive apparatus of the embodiment, since the groove 16 is formed between the escutcheon plate 9 and the wall portion 15, the dust and the like even skipping over the escutcheon plate 9 will collect in the groove 16 as shown in FIG. 5 by a number of dots. Therefore, the invasion of the dust and the like into the apparatus main body 1 is prevented. That is, this arrangement, by actively attracting the dust and the like to collect in the groove 16 reduces the amount of dust and the like invading the apparatus main body and as a result, efficacy in preventing the invasion of the dust and the like is enhanced.

Then, since the invasion of the dust and the like into the apparatus main body 1 can be prevented, problems associated with recording and reproducing due to the dust and the like decrease and a stable recording or reproducing action can be carried out.

Also, in the above embodiment, the wall portion 15 is provided only on the upper side of the tray 5, but by providing a wall portion of the same kind on the lower side of the tray 5, the efficacy in preventing the invasion of the dust and the like can be enhanced further.

Figure 6:
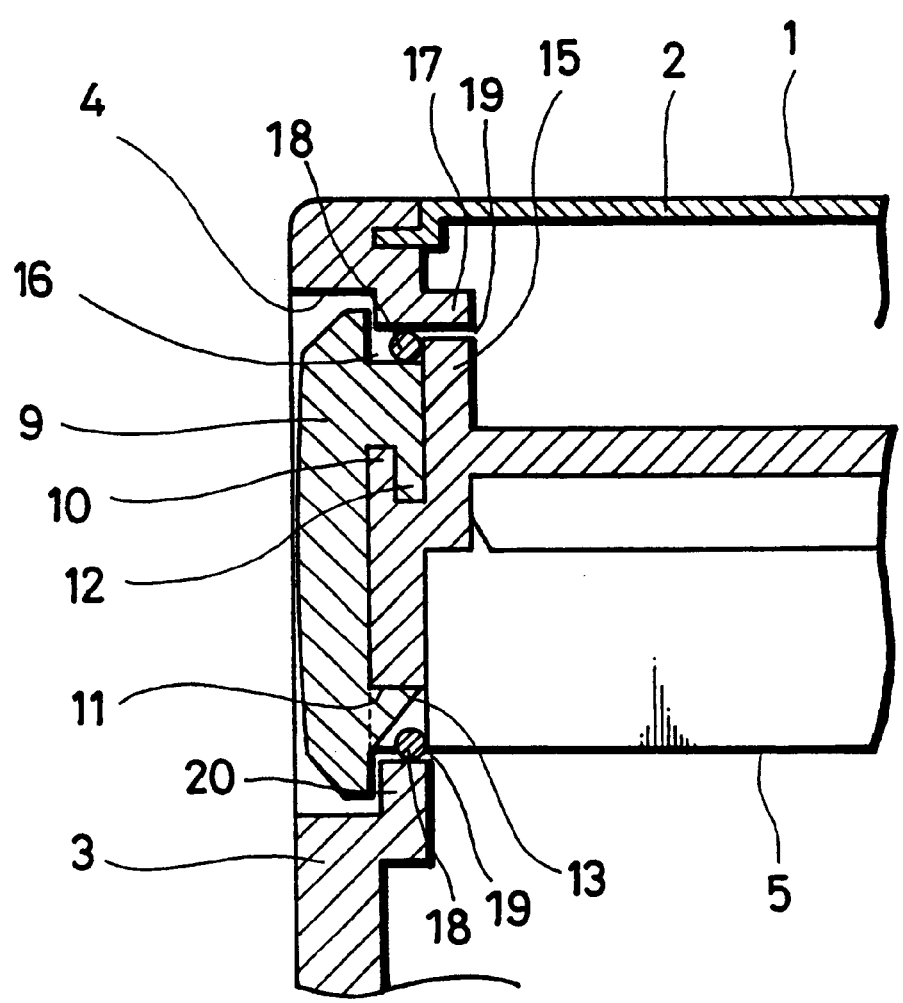
FIG. 6 is a longitudinal section side view showing an essential portion of another embodiment of the disk drive apparatus according to the present invention.

FIG. 6 shows another embodiment of the disk drive apparatus according to the present invention. In this embodiment an annular member 18 made of, for example, plastic and so on having elasticity and the like is fitted within the groove 16. The annular member 18 is so formed that it corresponds to clearances 19, 19 defined between the wall portion 15 and the convex portion 17, and between a convex portion 20 formed on the front panel 3 at its lower side to the tray 5 and the engagement convex portion 13, to close the clearances 19, 19.

By incorporating the annular member 18, the invasion of the dust and the like into the disk drive apparatus is more effectively prevented.

Also, the annular member 18 is not restricted to an annular body of one piece, but may be such which is formed by bonding a number of a plate-shaped elastic members.

According to the disk drive apparatus of the present invention explained so far, because the invasion of the dust and the like into the apparatus main body can be effectively prevented, problems associated with recording and reproducing due to the dust and the like decrease and a disk drive apparatus with high reliability can be presented. The present invention which has a simple arrangement of only providing the wall portion can be easily carried out.

Having described preferred embodiments of the present invention with reference to the accompanying drawings, it is to be understood that the present invention is not limited to to the above-mentioned embodiments and that various changes and modifications can be effected therein by one skilled in the art without departing from the spirit or scope of the present invention as defined in the appended claims.

What is claimed is:

1. A disk drive apparatus having a main body including a front panel, comprising:
   a tray movably mounted for movement between a drawn-out position and an accommodation position relative to the main body through an entry and exit portion of the front panel, said tray having an engagement fringe portion on a front end face thereof and a front wall portion;

said enter and exit portion of the front panel having a stepped convex portion facing an upper end surface of the front wall portion of the tray with a clearance therebetween;

a moving mechanism for loading a disk held on the tray onto a disk drive mechanism unit within the main body of the disk drive apparatus; and an escutcheon plate having an engagement nail portion for cooperating with said engagement fringe portion and attaching said escutcheon plate to a front end face of said tray, wherein said front wall portion is positioned parallel to and with an outer surface spaced apart from an inner surface of said escutcheon plate to create an inner barrier for preventing an invasion of dust into the main body of the disk drive apparatus and thereby forming a groove portion bounded by the inner surface of said escutcheon plate, an upper surface of said engagement nail portion, and the outer surface of said front wall portion of said tray, and further bounded by said stepped convex portion of said entry and exit portion of the front panel when said tray is in said accommodation position, and wherein said escutcheon plate has a height greater than a height of said front wall portion of said tray and greater than a height of said entry and exit portion of the front panel at a location of said stepped convex portion thereof through which said tray passes, whereby said groove portion collects dust prevented from entering said entry and exit portion by said front wall portion when said tray is in said accommodation portion.

2. The disk drive apparatus according to claim 1, further comprising an elastic member in said groove portion for closing a clearance between said tray and said front face of the rectangular portion of the front panel of the disk drive apparatus to prevent entry of the dust into the main body of the disk drive apparatus.

3. A disk drive apparatus having a main body, comprising:

a tray mounted for sliding movement between a drawn-out position and an accommodation position relative to said main body and in which a holding portion is formed for supporting a disk, said tray having an engagement fringe portion on a front end face thereof and a front wall portion;

a front panel provided on a front face of said main body of said disk drive apparatus and having an entry and exit portion through which said tray passes and a stepped convex portion facing an upper end surface of the front wall portion of the tray with a clearance therebetween;

an escutcheon plate having an engagement nail portion for cooperating with said engagement fringe portion and attaching said escutcheon plate to said front end face of said tray, wherein said front wall portion is provided on said tray parallel to and having an outer wall portion spaced apart from an inner surface of said escutcheon plate thereby forming a groove portion bounded by the outer surface of said front wall portion, an upper surface of said engagement nail portion, and the inner surface of said escutcheon plate, and further bounded by said stepped convex portion of said entry and exit portion of the front panel when said tray is in said accommodation position, and wherein said escutcheon plate has a height greater than a height of said front wall portion of said tray and greater than a height of said entry and exit portion of the front panel at a location of said stepped convex portion thereof through which said tray passes whereby said groove portion collects dust prevented from entering said entry and exit portion by said front wall when said tray is in said accommodation position.

4. The disk drive apparatus according to claim 3, further comprising an elastic member in said groove portion for closing a clearance between said tray and said front face of the rectangular portion of the front panel at said accommodation position to prevent entry of the dust into said main body of said disk drive apparatus.

* * * * *